United States Patent
Niemenmaa et al.

(10) Patent No.: US 11,671,437 B2
(45) Date of Patent: Jun. 6, 2023

(54) NETWORK TRAFFIC ANALYSIS

(71) Applicant: Cujo LLC, El Segundo, CA (US)

(72) Inventors: Matti Niemenmaa, Helsinki (FI); James Mathews, Espoo (FI)

(73) Assignee: Cujo LLC, Walnut, CA (US)

( * ) Notice: Subject to any disclaimer, the term of this patent is extended or adjusted under 35 U.S.C. 154(b) by 68 days.

(21) Appl. No.: 17/069,099

(22) Filed: Oct. 13, 2020

(65) Prior Publication Data

US 2022/0116409 A1 Apr. 14, 2022

(51) Int. Cl.

| | | |
|---|---|---|
| *H04L 29/06* | (2006.01) | |
| *H04L 12/26* | (2006.01) | |
| *H04L 12/66* | (2006.01) | |
| *H04L 9/40* | (2022.01) | |
| *H04L 43/0876* | (2022.01) | |

(52) U.S. Cl.
CPC .......... *H04L 63/1425* (2013.01); *H04L 12/66* (2013.01); *H04L 43/0876* (2013.01); *H04L 63/029* (2013.01)

(58) Field of Classification Search
CPC . H04L 63/1425; H04L 12/66; H04L 43/0876; H04L 3/029
See application file for complete search history.

(56) References Cited

U.S. PATENT DOCUMENTS

| | | | | |
|---|---|---|---|---|
| 2002/0108059 A1* | 8/2002 | Canion | ............... | H04L 63/1458 709/224 |
| 2006/0136570 A1* | 6/2006 | Pandya | ............... | G06F 9/30036 709/217 |
| 2007/0261112 A1* | 11/2007 | Todd | .................. | H04L 63/1483 726/2 |
| 2009/0063696 A1* | 3/2009 | Wang | ..................... | H04L 1/188 709/232 |
| 2009/0073884 A1* | 3/2009 | Kodama | ................. | H04L 47/10 370/235 |
| 2015/0215285 A1* | 7/2015 | Fleury | ..................... | H04L 67/10 726/13 |

(Continued)

FOREIGN PATENT DOCUMENTS

WO WO-2013055812 A1 * 4/2013 ......... G06F 9/45558

OTHER PUBLICATIONS

Extended European Search Report for EP Patent Application No. 21201905.3, dated Mar. 2, 2022, 9 pages.

(Continued)

*Primary Examiner* — Christopher B Robinson
(74) *Attorney, Agent, or Firm* — Dority & Manning, P.A.

(57) ABSTRACT

A network apparatus is configured to detect a network connection request on a platform having a hardware accelerator to process network traffic, wherein the hardware accelerator implements computing tasks related to data packets of at least part of the network traffic. The network apparatus is further configured to intercept the network traffic related to the network connection request before the start of the hardware accelerator process, to extract network connection data required by a network traffic analysis function from the network traffic, to allow the hardware accelerator to start acceleration process after the network connection data extraction has finished, and to analyse the network connection based on the extracted network connection data.

14 Claims, 3 Drawing Sheets

(56) References Cited

U.S. PATENT DOCUMENTS

2018/0278588 A1* 9/2018 Cela .................... H04L 63/1441

OTHER PUBLICATIONS

Efraim, R. et al., "Netdev 0x12—TC Connection tracking hardware offload," https://www.youtube.com/watch?v=EZ8-AcTJ4w, Sep. 11, 2018, 2 pages.

Oz, Schlomo et al., "TC Connection Tracking", NetDev 0x14, retrieved from the internet, https://legacy.netdevconf.info/0x14/pub/slides/48/Netdev_0x14_CT_offload.pdf, Sep. 19, 2020, 23 pages.

Oz, Schlomo et al., "Traffic Control connection tracking hardware offload," XP055890137, retrieved from the internet, https://legacy.netdevconf.info/0x14/pub/papers/48/0x14-paper48-talk-paper.pdf, Sep. 19, 2020, 4 pages.

Oz, Schlomo, "Netdev 0x14—TC Connection tracking hardware offload," XP055890155, retrieved from the internet, https://www.youtube.com/watch?v=gWklbJSk0YI, Oct. 9, 2020, 2 pages.

* cited by examiner

NETWORK TRAFFIC ANALYSIS

TECHNICAL FIELD

The present application relates generally to network traffic security, and specifically to network traffic analysis on platforms having a hardware accelerator.

BACKGROUND

It can be desirable to have reliable network traffic analysis methods that can be used with hardware accelerators.

SUMMARY

According to an aspect of the invention there is provided a method as specified in the independent claims.

According to other aspect of the invention, there is provided an apparatus in a computer network system as specified in the independent claims.

According to other aspect of the invention, there is provided a non-transitory computer-readable medium comprising stored program code, the program code comprised of computer-executable instructions that, when executed by a processor, causes the processor to operate as specified in the independent claims.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
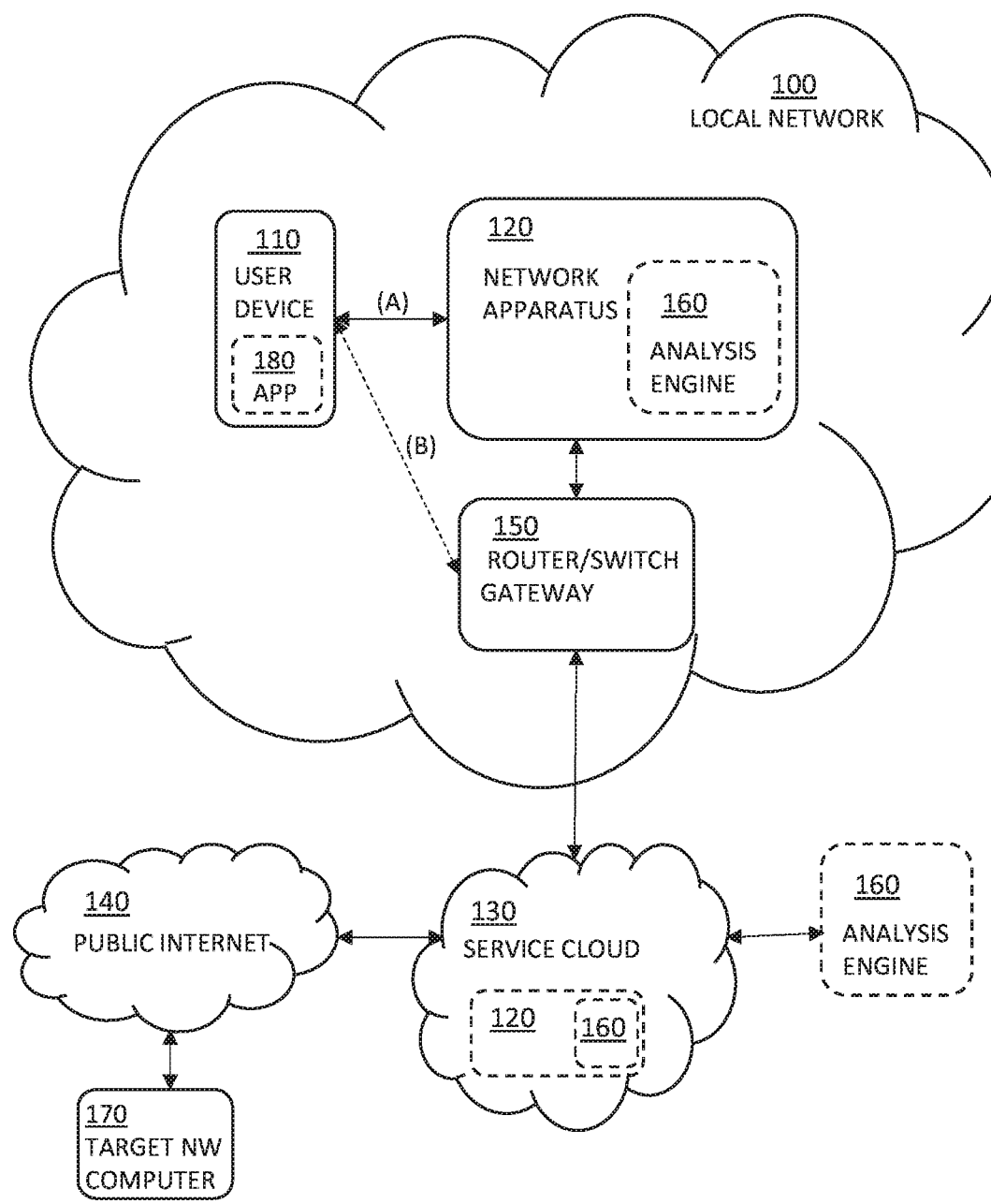
FIG. 1 illustrates an example system environment for a network apparatus in a computer network system.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for the purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message", and does not imply a priority, a type, an importance, or other attribute, unless otherwise stated herein.

As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

In the context of the present description, acceleration relates to the use of hardware accelerator and/or one or more hardware acceleration component (e.g. an application specific integrated circuit) that are configured to perform tasks faster and/or more efficiently than a general-purpose processor. At least part or substantially all the processing associated with a communications protocol stack may be processed by a hardware accelerator, that is, by other entity than the main processor of the host computer. This kind of offloading reduces the computational load on the main processor thereby freeing its resources for executing other application software rather than performing networking functions, for example.

Specialized hardware accelerators are commonly utilized at networking gateways for saving local processing resources. When a data packet is accelerated it is passed directly from one physical interface to another without entering the main processor, thus saving main processor cycles.

Network traffic analysis, such as security analysis related to a network connection and/or network device detection/identification analysis, that requires access to the payloads of data packets in a connection stream may be disrupted or impossible by this acceleration as the analysis tools typically run inside the main processor in kernel space or user space and the operating system has no visibility into these packets by design. In these situations, disabling the hardware acceleration would cause a significant impact on network bandwidth.

Thus, there is a need for network traffic analysis methods that can be used with hardware accelerators.

The design of different hardware accelerators or hardware accelerator components/modules may vary depending on the manufacturer, but the operating principles are similar: a decision is made on whether a data packet will be accelerated or not. The decision about when to accelerate is typically made by the hardware accelerators/hardware accelerator modules themselves or through signalling via a modified Linux kernel, for example. One common logic of enabling the hardware accelerator is to enable it after a TCP (Transmission Control Protocol) handshake, or in the case of an UDP (User Datagram Protocol), after a few packets between two endpoints. This offsetting allows for example the Linux kernel to make decisions about connections and then saving CPU cycles by not processing subsequent packets. This works since packets in the middle of a stream almost always follow the same rules as those in the beginning.

However, network traffic (security) analysis that requires access to the payloads of data packets in a connection stream may be disrupted or impossible by this acceleration as the analysis tools typically run inside the main processor in kernel space or user space and the operating system has no visibility into these packets by design. Disabling the hardware acceleration would in turn cause a significant impact on network bandwidth.

It has been realized that specific network traffic analysis functions do not require all the data in the network stream but, for example, only the data in the protocol header which is typically in the first few packets. Thus, in an embodiment, a system for monitoring network traffic connections on platforms with hardware accelerator is created by holding off the connection accelerator until the data required for the analysis, such as the protocol header data, has been extracted.

Thus, an embodiment of the present invention allows data streams to be accelerated as soon as the analysis has been completed. In an embodiment, the connections that are not to be analysed may be placed under the platform's default acceleration activation rules.

FIG. 1 illustrates schematically an example of a system environment for a network apparatus 120. The system environment illustrated in FIG. 1 includes a local network 100 that may include one or more devices 110 with a client application 180, the network apparatus 120, a local router/switch 150, and an analysis engine 160. The example system also includes a service cloud 130, such as a network operator's cloud and the Internet 140. The analysis engine 160 may reside in the local network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the local network 100. In another embodiment, the device 110 may communicate (B) directly via a network gateway or a modem 150, for example when the device is not in the local network 100. In an embodiment, the network operators may deploy a service platform on their broadband gateways 150 provided to customers and in their own cloud environments 130. The user device(s) 110 may also be configured to use the services provided by the service cloud 130 by one or more applications 180 installed on the device(s) 110.

The device 110 may be any computer device having Internet browsing capabilities, such a smartphone, laptop or a tablet. The network apparatus 120 collects information e.g. about the local network 100, including data about the network traffic through the local network 100 and data identifying devices in the local network 100, such as any smart appliances and user devices 110. The network apparatus 120 is configured to receive traffic control instructions from the analysis engine 160 and to process network traffic based on the traffic control instructions. Processing the network traffic through the local network 100, for example, can include restricting where network traffic can travel, blocking network traffic from entering the local network 100, redirecting a copy of network traffic packet or features of those packets to the analysis engine 160 for analysis (e.g., for malicious behaviour), or quarantining the network traffic to be reviewed by a user (e.g., via the user device 110) or network administrator. In some embodiments, the functionality of the network apparatus 120 is performed by a device that is a part of the local network 100, while in other embodiments, the functionality of the network apparatus 120 is performed by a device outside of the local network 100.

The network apparatus 120 may be configured to monitor traffic that travels through the local network 100. In some embodiments, the network apparatus 120 can be a device that is a part of the local network 100. The network apparatus 120 can be connected to the local network 100 using a wired connection (e.g. via an Ethernet cable connected to a router) or using a wireless connection (e.g. via a Wi-Fi connection). In some embodiments, the network apparatus 120 can comprise multiple devices. In some embodiments, the network apparatus 120 can also perform the functions of the local network router 150 for the local network 100.

In some embodiments, the network apparatus 120 may intercept traffic in the local network 100 by signalling to the user device 110 that the network apparatus 120 is router 150. In some embodiments, the network apparatus 120 replaces the default gateway or gateway address of the local network 100 with its own internet address. In some embodiments, the local network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the local network 100.

The analysis engine 160 may receive and analyse network traffic data (e.g., forwarded by the network apparatus 120) associated with devices on the computer network. The analysis engine 160 may be implemented within a remote system (e.g., a cloud server) or within the local network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the local network router 150 may be configured to forward network traffic to the analysis engine 160. In some embodiments, the analysis engine 160 communicates with other devices on the computer network. In some embodiments, the analysis engine 160 is integrated into the network apparatus 120.

The local network 100 is a local area network (LAN) that comprises the one or more devices 110, network apparatus 120, and local network router 150. The local network 100 may be used for a number of purposes, including a home network or a network used by a business. The local network 100 is connected to the internet 140, allowing devices within the local network 100, including the user device 110, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 100 may comprise any combination of LANs and wide area networks (WANs), using both wired and wireless communication systems. In some embodiments, the internet 140 and the local network 100 use standard communications technologies and protocols. Data exchanged over the internet 140 and the local network 100 may be represented using any suitable format, such as hypertext markup language (HTML) or extensible markup language (XML). In some embodiments, all or some of the communication links of the internet 140 and the local network 100 may be encrypted using any suitable technique or techniques.

The user device 110 is a computing device capable of receiving user input as well as transmitting and/or receiving data via the Internet 140 or local network 100. In some embodiments, a user device 110 is a conventional computer system, such as a desktop or a laptop computer. Alternatively, a user device 110 may be a device having computer functionality, such as a personal digital assistant (PDA), a mobile telephone, a smartphone, or another suitable device. The user device 110 is a network device configured to communicate with the Internet 140 or local network 100. In some embodiments, the user device 110 executes an application (e.g., application 180) allowing a user of the user device 110 to interact with other network devices, such as the smart appliances, the network apparatus 120, the router 150, or the analysis engine 160. For example, the user device 110 executes a browser application to enable interaction between the user device 110 and the network apparatus 120 via the local network 100.

The client application 180 is a computer program or software application configured to run on the user device 110. For example, the application 180 is a web browser, a mobile game, an email client, or a mapping program. The user device 110 can have any number of applications 180 installed. The application 180 may communicate, via the user device 110, with devices inside and outside of the local network 100.

The application 180 operates in either an active or a passive state. In a passive state, the application is running in the background of the user device 110 or is running on an idle device or in an idle state and may have reduced functionality. In an active state, the application 180 may be receiving input from a user and may have increased functionality compared to the passive state. Thus, in an active state, the application 180 may transmit and receive increased levels of network traffic compared to the passive state.

Figure 2:
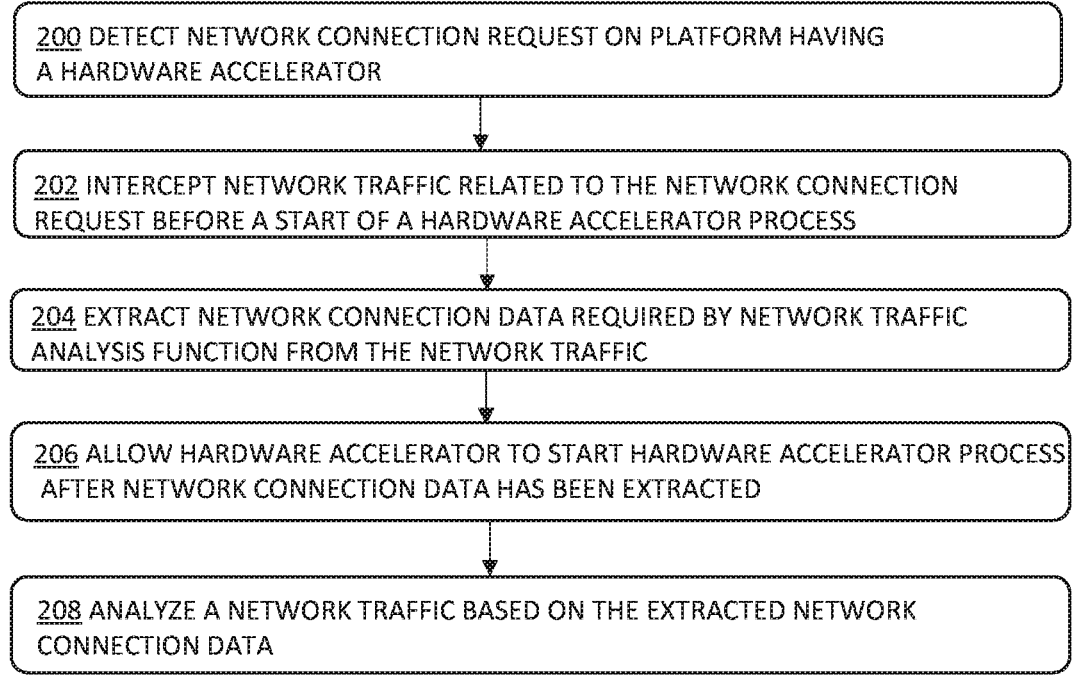
FIG. 2 illustrates a method, according to one embodiment.

FIG. 2 is a flow diagram illustrating an example of an embodiment of a method at a network apparatus.

In 200, a network connection request is detected on a platform having a hardware accelerator to process network traffic, wherein the hardware accelerator implements computing tasks related to data packets of at least part of the network traffic.

In 202, the network traffic related to the network connection request is intercepted before the start of the hardware accelerator process.

In 204, network connection data required by a network traffic analysis function is extracted from the network traffic.

In 206, the hardware accelerator is allowed to start the acceleration process after the network connection data extraction has finished.

In 208, the network connection is analysed based on the extracted network connection data.

In an embodiment, the extracted network connection data required by the network traffic analysis function comprises protocol header data including one or more data packets required for performing the network traffic connection analysis.

In an embodiment, the method further comprises marking the network connection once the network connection data has been extracted. The hardware accelerator is allowed to start the acceleration process based on the mark. In an embodiment, a connection tracking module, such as connmark, may be used to manage marking of network connections.

In an embodiment, the extracting of the network connection data is processed in a matching function of a user-space utility program rule. For example, the networking gateway may have a kernel module which is capable of extracting the TLS (Transport Layer Security) handshake from HTTPS (Hypertext Transfer Protocol Secure) or the HTTP header from HTTP (Hypertext Transfer Protocol). In an embodiment, the user-space utility program comprises a kernel-level iptables component used for configuring IP packet filter rules. The matching function works on a per data packet basis and maintains an internal state between outgoing and incoming data packets.

In an embodiment, the method further comprises taking further action to protect the computer system and/or one or more network devices based on the analysis of the network traffic. Protecting the computer system and/or one or more network devices may comprise one or more of: blocking or preventing a network connection, blocking or preventing the network connection request(s), blocking a connection request if the host is blacklisted, providing a security alert, initiating further security analysis action for analysing or more network devices and/or the computer network, and disallowing a connection request based on the analysis. In an embodiment, the method further comprises identifying one or more network devices of the computer network based on analysing the network traffic, and taking further action to protect the computer network and/or the one or more network devices, wherein the further action comprises one or more of: managing network communication of the one or more network devices, blocking a connection request from the one or more network devices, and providing a security alert.

Figure 3:
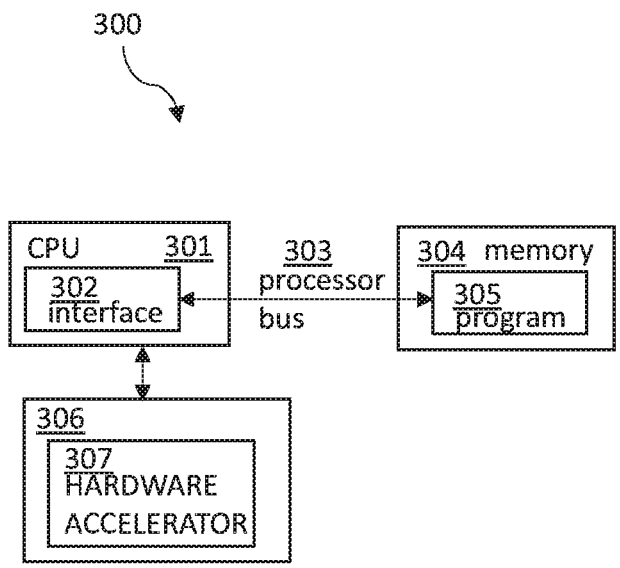
FIG. 3 is a block diagram of an apparatus, according to one embodiment.

Turning now to FIG. 3 that is showing an example of a computing system 300 that implements an apparatus, such as a gateway, a router, a switch, a 5G modem, or other network level apparatus, and a hardware accelerator according to one embodiment. The computing system 300 comprises a processor 301 that includes a memory interface 302. The memory interface 302 is a bus protocol for communication between the processor and the memory 304, for example. The processor 301 is coupled to the memory 304 via a processor bus 303. The processor bus 303 transmits data signals between the processor 301 and other components in the system 300.

In an embodiment, the system 300 may include a logic device 306 operatively coupled to the processor 301. The logic device 306 may be a programmable or a non-programmable logic device. In an embodiment, the logic device may be a field-programmable gate array (FPGA) or an Application Specific Integrated Circuit (ASIC), a generic array logic, or other type of logic device. In one embodiment, the logic device 306 includes a hardware accelerator 307 to perform data packet acceleration from one physical interface to another without entering the main processor 301.

In an embodiment, the hardware accelerator 307 refers to a specialized computer hardware for performing predetermined functions more efficiently than is possible in software running on a general-purpose central processing unit (CPU) 301.

The processor 301 is configured to detect connection requests relating to monitored network traffic passing through the system. Further, the processor 301 is configured to intercept the detected network traffic before the start of the hardware accelerator process by the hardware accelerator 307. The processor 301 is further configured to extract network connection data required by a network traffic analysis function from the network traffic related to the network connection request and to allow the hardware accelerator 307 to start acceleration process after the network connection data extraction has finished. Finally, the processor 301 is configured to analyse the network connection based on the extracted network connection data. However, in some embodiments, this analysis can also be implemented in some other device external to the system 300.

In an embodiment, the processor 304 is further configured to store data such as data related to the connection requests, state information and any other data to a database (not shown) located at the apparatus 300 or at a remote database.

In the above description, the apparatus is described as having a single processor 301 but it will be appreciated that the function of the processor may be performed by a single physical processor or by more than one processors. Further, while the computing system above is described as having a single hardware accelerator 307, it will be appreciated that the function of hardware acceleration may be performed by single or more than one hardware accelerators 307.

The memory 304 may be used to store a computer program 305 which, when executed by the processor 301, causes the processor 301 to perform the functions described above. The computer program 305 may be provided from an external source. In an embodiment, at least some or even all of the functions of the method can be implemented in any apparatus, for example the user device or a server.

Figure 4:
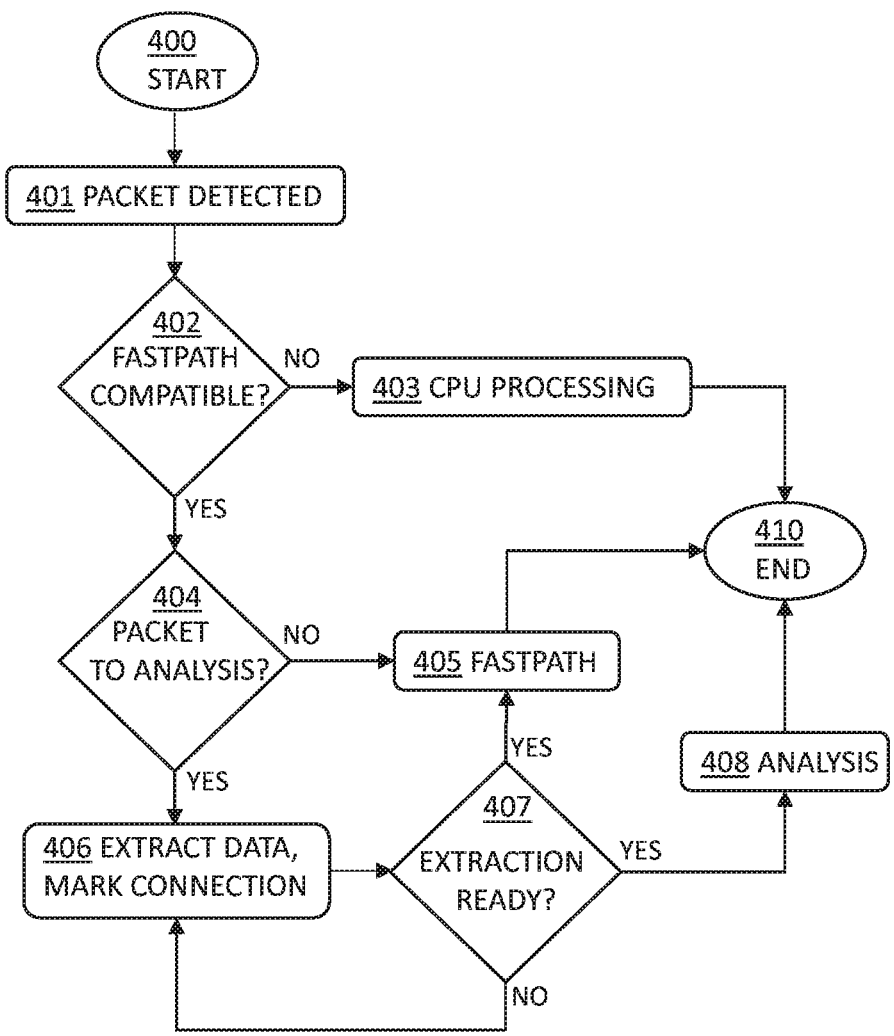
FIG. 4 is a flow diagram illustrating a process, according to one embodiment.

FIG. 4 shows a flow diagram illustrating a process, according to one embodiment. The process starts at 400. In 401, a data packet related to a network connection request is detected. In 402, it is determined whether the detected data packet is fastpath compatible, that is, whether this traffic will be handled via the hardware accelerator process more efficiently than the "normal" path. If the received data packet is not fastpath compatible, then normal CPU processing is entered in 403. If fastpath is to be used for this data packet, then 404 is entered where it is determined whether the detected data packet requires analysis by a security analysis engine for example. If not, then 405 is entered where the hardware accelerator process is allowed to start. If the data packet requires analysis, then 406 is entered where any data required by a security analysis function, such as a network traffic analysis function, is extracted and the connection is marked. In 407, it is detected whether the data extraction is ready and if so, then in 405, the hardware accelerator process is allowed to start based on the mark. Further in 408, the security analysis is performed based on the extracted data. The method ends in 410.

It will be appreciated that various modifications may be made to the above described embodiments without departing from the scope of the present invention. For example, the database or analysis engine may be in separate entities to the apparatus, in which case the apparatus will send queries remotely to the analysis engine.

The steps, signalling messages and related functions described above in relation to the figures are in no absolute chronological order, and some of the steps may be performed simultaneously or in a different order. Other functions may also be executed between the steps and other signalling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions.

The computer program code comprises a code for detecting a network connection request on a platform having a hardware accelerator to process network traffic, a code for intercepting the network traffic related to the network connection request before the start of the hardware accelerator process, a code for extracting network connection data required by a network traffic analysis function from the network traffic, a code for allowing the hardware accelerator to start acceleration process after the network connection data has been extracted, and a code for analysing the network traffic based on the extracted network connection data.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   detecting, at a network apparatus, a network connection request, the network apparatus comprising a processor device and a hardware accelerator to process network traffic, wherein the hardware accelerator implements computing tasks related to data packets of at least part of the network traffic, the computing tasks comprising passing the data packets directly from one physical interface to another without entering the processor device;
   intercepting, by the processor device, the network traffic related to the network connection request before a start of a hardware accelerator process by the hardware accelerator;
   extracting, by the processor device, network connection data required by a network traffic analysis function from the network traffic, the network connection data comprising protocol header data;

allowing, by the processor device, the hardware accelerator to start the hardware accelerator process to process the network traffic after the network connection data has been extracted; and concurrent with the hardware accelerator processing the network traffic:

analysing, by the processor device, the network traffic based on the network connection data;

detecting, by the processor device, based on analysing the network traffic, a security threat; and in response to detecting the security threat, blocking, by the processor device, a network connection.

2. The method according to claim 1, wherein the protocol header data includes one or more data packets required for the network traffic analysis function.

3. The method according to claim 1, wherein the network apparatus is installed on a network gateway.

4. The method according to claim 1, wherein the hardware accelerator is configured to implement the computing tasks related to data packets faster and/or more efficiently than a general-purpose processor.

5. The method according to claim 1, the method further comprising marking the network connection once the network connection data has been extracted; and allowing the hardware accelerator to start the hardware accelerator process based on the marking.

6. The method according to claim 1, wherein extracting the network connection data comprises processing the network connection data in a matching function of a user-space utility program rule.

7. The method according to claim 6, wherein the matching function works on a per data packet basis and maintains an internal state between outgoing and incoming data packets.

8. An apparatus comprising:

one or more processor devices;

a hardware accelerator operable to process network traffic, wherein the hardware accelerator is operable to implement computing tasks related to data packets of at least part of the network traffic, the computing tasks comprising passing the data packets directly from one physical interface to another without entering the one or more processor devices; and a non-transitory computer-readable medium comprising stored program code, the program code comprised of computer-executable instructions that, when executed by the one or more processor devices, causes the one or more processor devices to:

detect a network connection request;

intercept the network traffic related to the network connection request before a start of a hardware accelerator process by the hardware accelerator;

extract network connection data required by a network traffic analysis function from the network traffic, the network connection data comprising protocol header data;

allow the hardware accelerator to start the hardware accelerator process to process the network traffic after the network connection data has been extracted; and concurrent with the hardware accelerator processing the network traffic:

analyse the network traffic based on the network connection data;

detect, based on analysing the network traffic, a security threat; and in response to detecting the security threat, block the network connection.

9. The apparatus according to claim 8, wherein the protocol header data includes one or more data packets required for the network traffic analysis function.

10. The apparatus according to claim 8, wherein the apparatus is installed on a network gateway.

11. The apparatus according to claim 8, the instructions further causing the one or more processor devices to: mark the network connection once the network connection data has been extracted; and allow the hardware accelerator to start the hardware accelerator process based on the marking.

12. The apparatus according to claim 8, the instructions further causing the one or more processor devices to process the extracting of the network connection data in a matching function of a user-space utility program rule.

13. The apparatus according to claim 12, wherein the matching function works on a per data packet basis and maintains an internal state between outgoing and incoming data packets.

14. A non-transitory computer-readable medium comprising stored program code, the program code comprised of computer-executable instructions that, when executed by a processor device of a network apparatus that includes a hardware accelerator operable to process network traffic, cause the processor device to:

detect a network connection request, wherein the hardware accelerator is operable to implement computing tasks related to data packets of at least part of the network traffic, the computing tasks comprising passing the data packets directly from one physical interface to another without entering the processor device;

intercept the network traffic related to the network connection request before the start of the hardware accelerator process by the hardware accelerator;

extract network connection data required by a network traffic analysis function from the network traffic, the network connection data comprising protocol header data;

allow the hardware accelerator to start the hardware accelerator process to process the network traffic after the network connection data has been extracted;

concurrent with the hardware accelerator processing the network traffic:

analyse the network traffic based on the network connection data;

detect, based on analysing the network traffic, a security threat based on the network traffic; and in response to detecting the security threat, block the network connection.

\* \* \* \* \*